United States Patent [19]

Fujiyoshi

[11] Patent Number: 4,794,835
[45] Date of Patent: Jan. 3, 1989

[54] PLATE-LIKE ROTARY BODY WITH VIBRATION-SUPPRESSING CHARACTERISTICS AND METHOD OF MANUFACTURING SAME

[75] Inventor: Yoshihisa Fujiyoshi, Gifu, Japan

[73] Assignee: Kanefusa Hamono Kogyo Company Limited, Nagoya, Japan

[21] Appl. No.: 939,753

[22] Filed: Dec. 9, 1986

[30] Foreign Application Priority Data

Dec. 20, 1985 [JP] Japan .................. 60-288973
Oct. 11, 1986 [JP] Japan .................. 61-241807

[51] Int. Cl.$^4$ .................. B27B 33/08; B23D 63/00
[52] U.S. Cl. .................. 83/835; 76/112
[58] Field of Search .................. 83/835–848; 76/112, 10 A

[56] References Cited

U.S. PATENT DOCUMENTS 3,981,216 9/1976 Lemmon .................. 83/835
4,574,676 3/1986 Jansen-Herfeld .................. 83/835
4,584,920 4/1986 Jansen-Herfeld .................. 83/835

FOREIGN PATENT DOCUMENTS 8505064 11/1985 World Int. Prop. O. .................. 83/651

Primary Examiner—Paul A. Bell
Assistant Examiner—Hien H. Phan
Attorney, Agent, or Firm—Flehr, Hohbach, Test, Albritton & Herbert

[57] ABSTRACT

A plate-like rotary body such as a circular saw has zigzag slits formed in the outer peripheral area or spanning the outer and middle peripheral areas such that the resulting protruding sections on both sides of each slit are elongated and deformed within its plane so as to touch the adjacent protruding section from opposite side, thereby providing frictional resistance to suppress vibrations of the body when it rotates. Such slits are preferably formed by a high-energy beam such as a laser beam or an electron beam for efficiency.

19 Claims, 7 Drawing Sheets

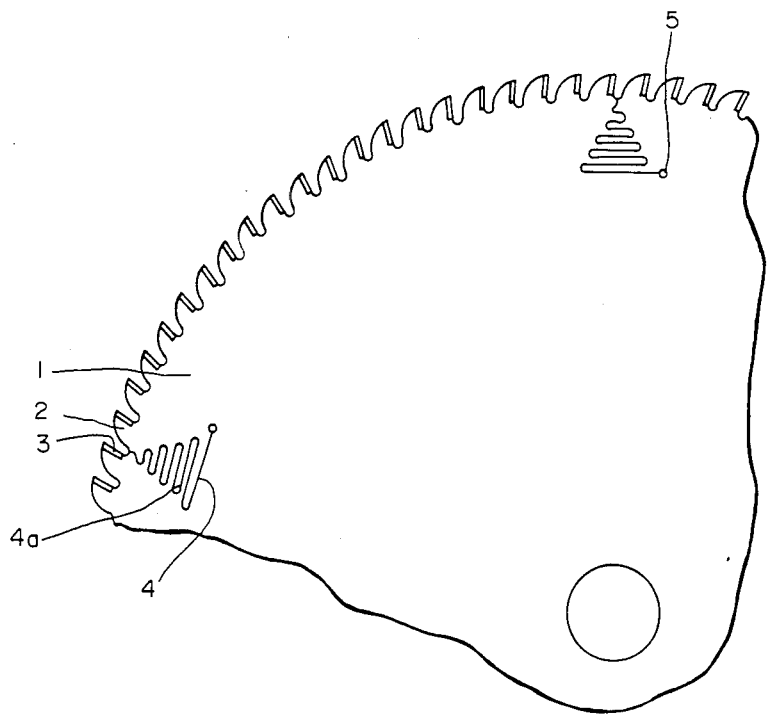
FIG.—1
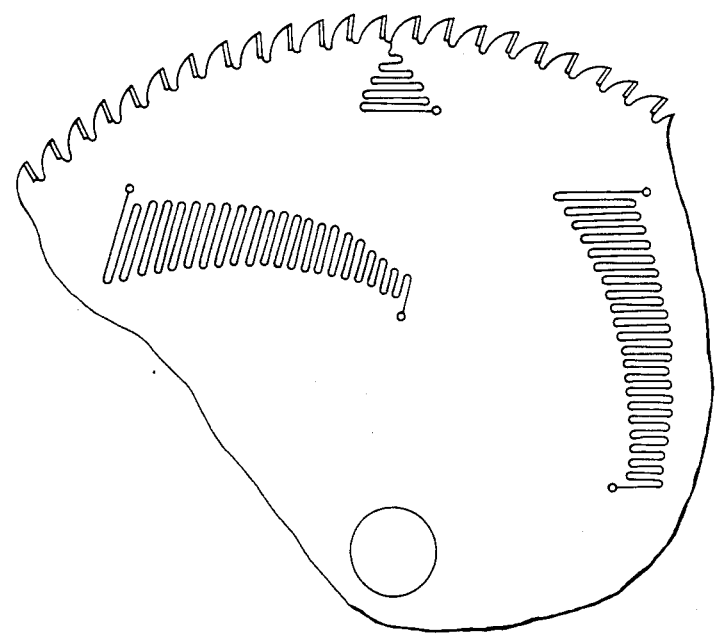
FIG.—4

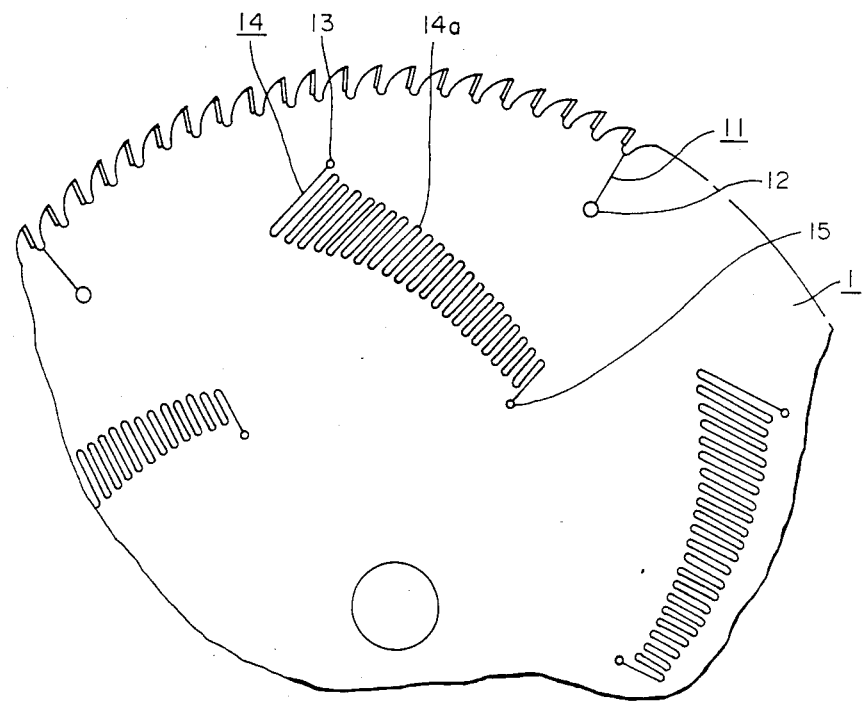
FIG.—2
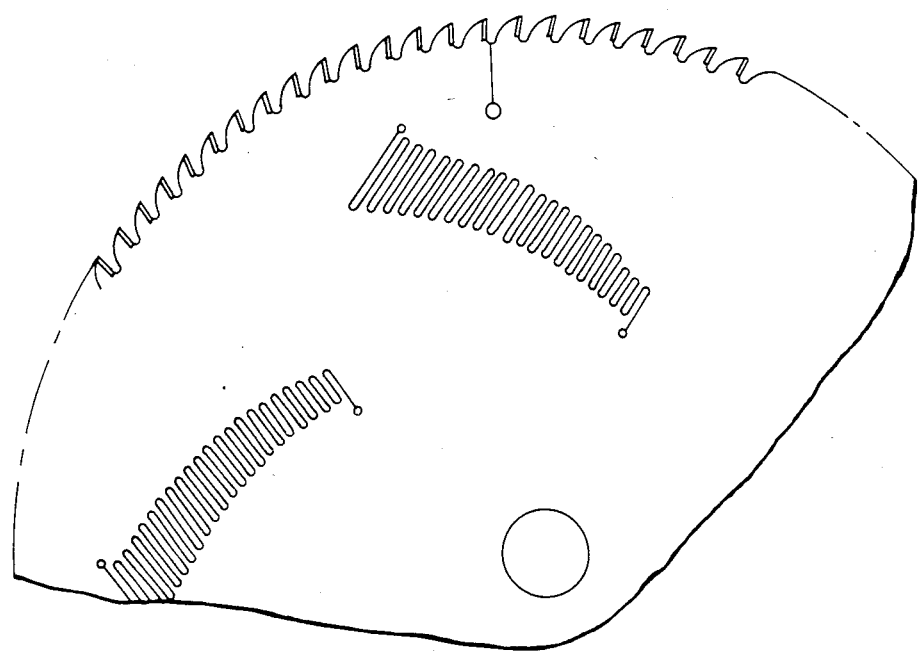
FIG.—3

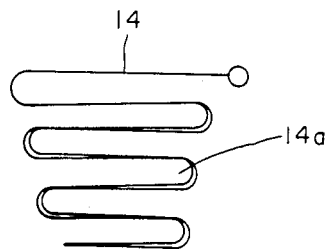
FIG.—5A
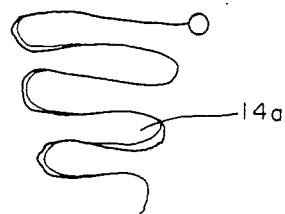
FIG.—5B
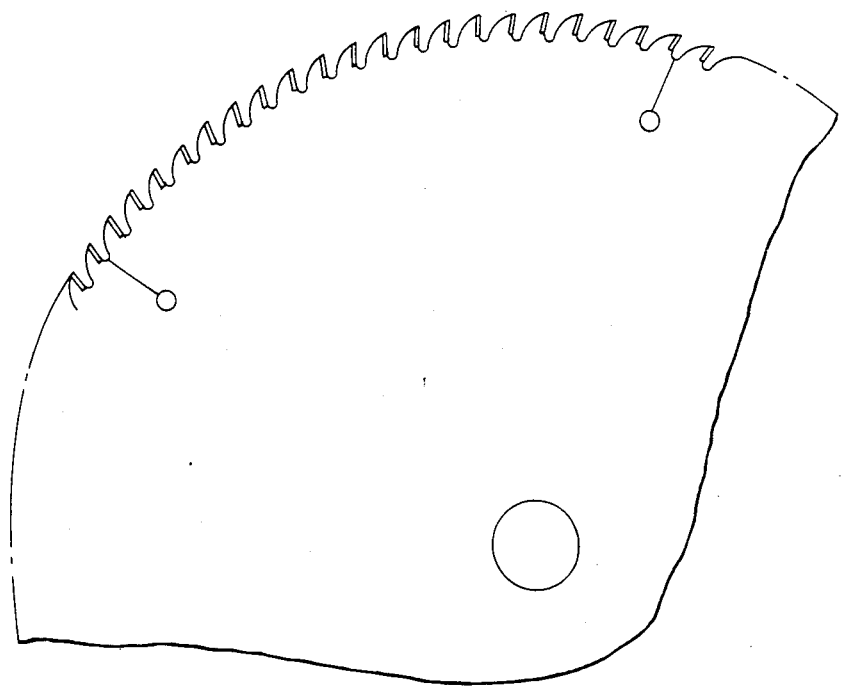
(PRIOR ART)
FIG.—6

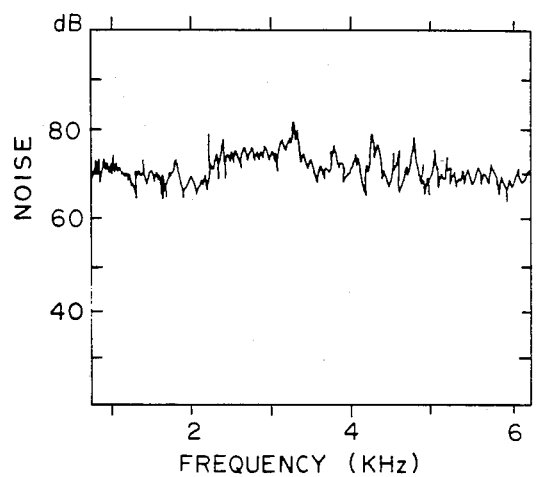
FIG.—7
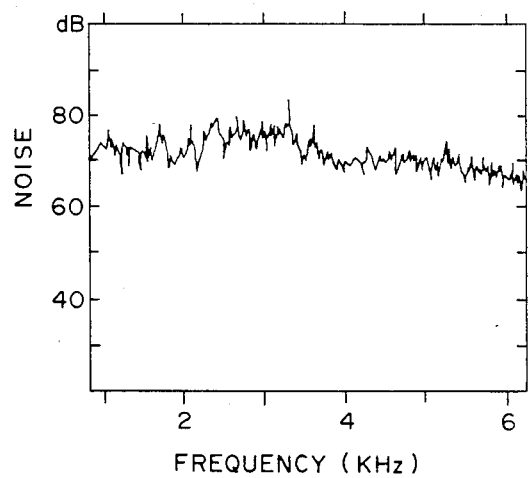
FIG.—8

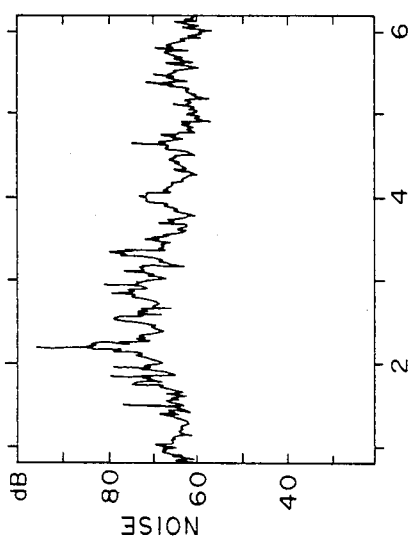
FIG.—11
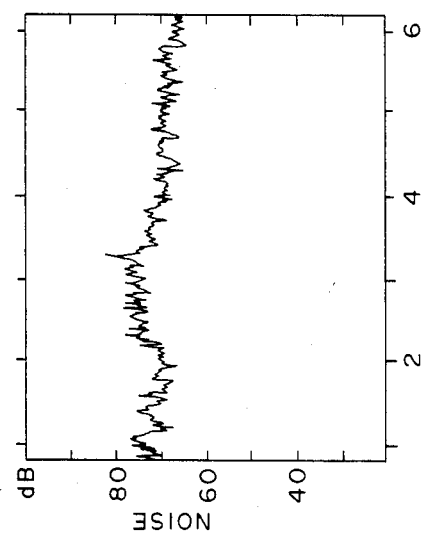
FIG.—10
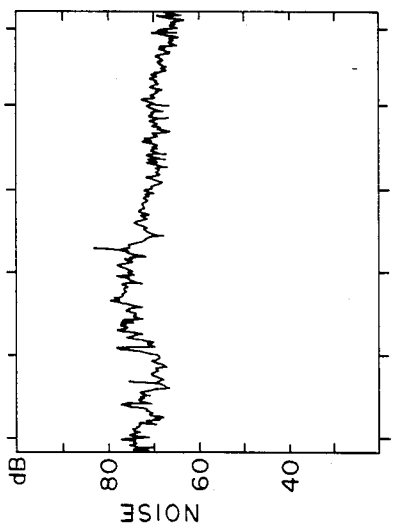
FIG.—9

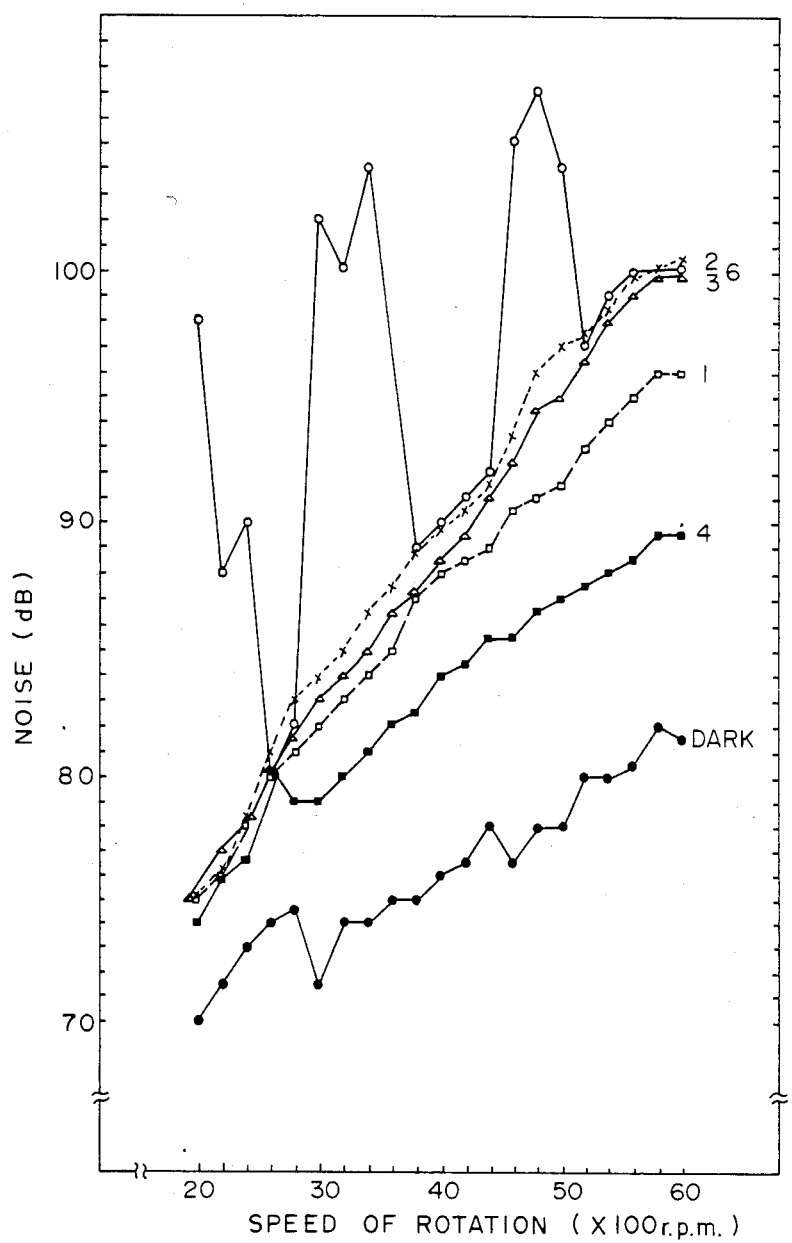
FIG.—12

(PRIOR ART)
FIG.—13
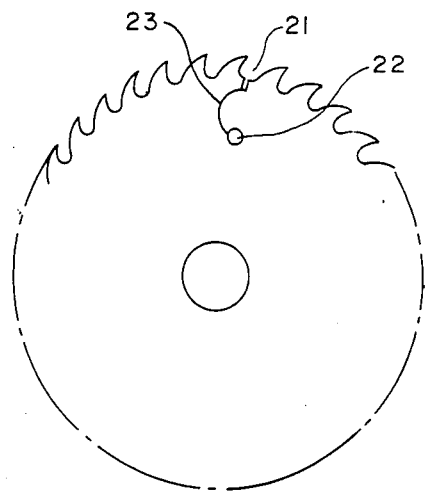
(PRIOR ART)
FIG.—14
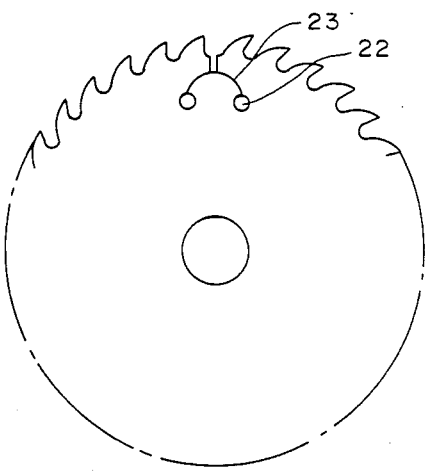
(PRIOR ART)
FIG.—15
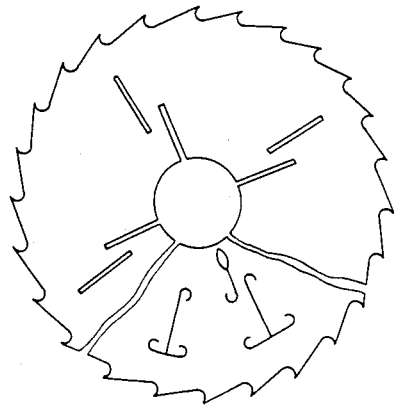

PLATE-LIKE ROTARY BODY WITH VIBRATION-SUPPRESSING CHARACTERISTICS AND METHOD OF MANUFACTURING SAME

BACKGROUND OF THE INVENTION

This invention relates to a plate-like rotary body such as a circular saw with vibration-suppressing characteristics which may be used in a wide range of applications and a method of manufacturing such a body.

A circular saw tends to develop Karman vortices on the backside of cutting edges and to cause vibrations when it idles. When the rotational speed of the saw corresponds to one of its characteristic frequencies, unpleasant metallic noise developed by it becomes particularly large. During a cutting operation, the saw begins to vibrate because of the alternate cutting load applied on the cutting edges, resulting not only in large noise but also in a resonance phenomenon with the characteristic frequency of the rotary body. In view of this situation, various vibration-suppressing means have been considered. Japanese patent publication Tokko No. 53-16952 disclosed circular saws, as shown in FIGS. 13 and 14, with a small notch 21 formed from the bottom of its tooth section towards the center. A curved slit or slits 23 are formed to connect the deep end of this notch 21 with a circular hole or holes 22 drilled in the saw plate such that vibrations are suppressed by the close contact between the parts on both sides of the curved slit or slits. Under severe conditions of use, however, such a notch frequently causes deformation in the saw plate, rendering the saw unusable. Japanese patent publication Tokkai No. 59-134616 disclosed, as shown in FIG. 15, a circular saw with very narrow slits in radical directions to suppress vibrations but their effects are not totally satisfactory.

SUMMARY OF THE INVENTION

It is therefore an object of the present invention to provide a plate-like rotary body with vibration-suppressing characteristics.

It is another object of the present invention to provide a plate-like rotary body such as a circular saw which is not noisy when it rotates freely or during a cutting operation.

It is still another object of the present invention to provide a method of manufacturing such a rotary body.

The above and other objects of the present invention are achieved by providing zigzag slits in the outer peripheral area or spanning the outer and middle peripheral areas of a plate-like rotary body such that the comb-like protruding sections on both sides of each slit are elongated and further deformed within the plane of the body to touch the adjacent protruding section from the opposite side. Such contacts provide necessary frictional resistance to suppress vibrations which would be caused by the rotation of the body. Such zigzag slits may be formed preferably by a high energy beam such as a laser beam or an electron beam because required deformations of the protruding sections automatically result from the cooling of the material as it is cut.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is a plan view of a circular saw according to an embodiment of the present invention, FIG. 2 is a plan view of a circular saw according to another embodiment of the present invention, FIG. 3 is a plan view of a circular saw according to a third embodiment of the present invention, FIG. 4 is a plan view of a circular saw according to a fourth embodiment of the present invention, FIGS. 5A and 5B are schematic drawings which show how adjacent protruding sections touch each other according to the present invention, FIG. 6 is a plan view of a circular saw with slits of a conventional type, FIG. 7 is a graph for vibrational frequency analysis for the saw of FIG. 1, FIG. 8 is a graph for vibrational frequency analysis for the saw of FIG. 2, FIG. 9 is a graph for vibrational frequency analysis for the saw of FIG. 3, FIG. 10 is a graph for vibrational frequency analysis for the saw of FIG. 4, FIG. 11 is a graph for vibrational frequency analysis for the saw of FIG. 6, FIG. 12 is a graph showing the noise levels by the saws of FIGS. 1, 2, 3, 4 and 6 when they rotate freely, FIG. 13 is a plan view of a prior art circular saw, FIG. 14 is a plan view of another prior art circular saw, and FIG. 15 is a plan view of still another prior art circular saw.

DETAILED DESCRIPTION OF THE INVENTION

With reference to FIG. 1, a circular saw 1 according to one embodiment of the present invention has, in addition to a plurality of teeth 2 having brazed blade chips 3, slits 4 of 0.1–0.3 mm in width which are formed by a high-energy beam such as a laser beam or an electron beam each from the bottom of a gullet towards the center of the saw 1. Each slit is approximately straight for a few millimeters (such as 2 mm) at the beginning and thereafter follows a zigzag line, each time turning along a circular arc to reverse its direction and advancing in the opposite direction along a path about 2 mm aside. The amplitude of the zigzag line increases gradually as shown from about 2 mm to about 20 mm. In other words, each zigzag line produces two sets of mutually engaging comb-like formations each with a plurality of tongue-like elongated protruding sections alternating with recesses such that these protruding sections from one side of the slit are received in the recesses on the other side. The slit 4 ends in a circular hole 5 which is provided in order to prevent a crack from developing as a continuation of the slit. Several such slits 4 are provided around the periphery of the saw, spaced approximately evenly.

As mentioned above, the zigzag slit 4 defining comb-like sections on both sides is advantageously formed by a high-temperature cutting process. Let us now consider the process of forming one of these comb-like protrusions, say, by a laser beam. After the laser beam cuts one side of a protrusion and turns around the end section 4a to cut the other side of the protrusion, the side along which the slit is being cut is hot and this part of the protrusion undergoes thermal expansion while the first side of the protrusion is already cool. As a result of this delay in time, the protrusion becomes deformed in the direction of the cooler side within the plane of the saw as the laser spot moves along its trejectory. Since the slit width is very small, the aforementioned deformation of the protrusion causes its end to come into contact with the root section of the adjacent protrusion in the opposite direction as shown in FIG. 5(a). It is the friction between these mutually contacting parts that tends to suppress vibrations of the saw. FIG. 5(a) is merely intended to be an example. The width of each protruison need not be uniform along its length. The zigzag line may be as shown in FIG. 5(b).

According to another embodiment of the present invention illustrated in FIG. 2, a slit 11 of width about 1 mm and length about 10% or somewhat greater of the radius of the circular saw 1 (about 1/9 according to the embodiment shown in FIG. 2) is formed by mechanical means or by a laser beam at several places around the periphery from the bottom of a gullet towards the center. As explained by way of the example described above, a hole 12 of several millimeters in diameter is drilled at the end of the slit 11 for preventing cracking. This hole 12 may be filled with material such as aluminum, if necessary.

In addition to these holes 12 and slits 11, holes 13 of several millimeters in diameter are also drilled in the saw 1 such that each of these additional holes 13 is approximately at equidistance from a mutually adjacent pair of holes 12 and also at equidistance from the center of the saw 1 as the holes 12. A zigzag slit 14 of 0.1-0.3 mm in width, similar to those in the previous example of FIG. 1, is formed from each of these additional holes 13 diagonally and curvingly towards the center until it reaches an inner end hole 15 of several millimeters in diameter at about one-half the distance between the (outer end) hole 13 and the center of the saw 1. The amplitude of this zigzag slit 14 decreases gradually from about 25 mm near the outer end hole 13 to about 11 mm near the inner end hole 15, and the slit includes 42 turns according to the particular embodiment illustrated in FIG. 2. As explained above, the protrusions formed on both sides of the slit 14 become deformed at the tips 14a and touch the adjacent protrusion as shown in FIGS. 5(a) and 5(b). The amplitude variation and positions of the slits need not be exactly as shown in FIG. 2. For example, FIG. 3 shows another embodiment of the present invention which is similar to the one shown in FIG. 2 but is characterized as having the zigzag slit formed closer to one of the straight slits formed from the periphery of the saw. FIG. 4 is still another embodiment of the present invention characterized as having the straight slits 11 of FIG. 2 replaced by zigzag slits with increasing amplitude. The zigzag slits 14 of FIGS. 2, 3 and 4 are somewhat concave as a whole towards the center but this is not intended to limit the scope of the present invention.

In what follows, distinguishing characteristics of the saws according to the present invention, as experimentally observed, are described in comparison with a saw having only slits of a conventional type. The saws described in FIGS. 1, 2, 3, 4 and 6 are identified hereinbelow by their Saw Nos. 1, 2, 3, 4 and 6, respectively.

(1) Damping Capacity of Saw Body

FIG. 6 shows a circular saw with slits of a conventional type. For each of the saws shown in FIGS. 1, 2, 3, 4 and 6, ability to suppress vibrations was measured by securing it to a shaft and striking it hard with a wooden hammer approximately at a mid-point between two adjacent slits on the periphery. The frequency range of sound which is particularly noisy to a person was centered around about 4000 Hz and in the range of about 3500–4500 Hz. The noise level was measured when the sound in this range became about 75 dB. The results of this experiment are shown in the column marked "(a) 0 sec." in Table 1. Similar measurements were taken 0.25 seconds and 0.5 seconds thereafter and the measured noise values are shown in the columns marked "(b) 0.25 sec." and "(c) 0.5 sec.", respectively. Similar noise values were also obtained for other frequency ranges (2800–3500 Hz, 2250–2800 Hz and 1950–2250 Hz) and these results are also shown in Table 1. Ability of each saw to attenuate noise in each of the frequency ranges is defined by $10 \log_{10} (a)/(c)$. This value is listed also in Table 1 for each saw and for each of the frequency ranges considered. A large attenuation value means superior ability to suppress vibrations. For this experiment, use was made of a frequency analyzer manufactured by Sanei, Inc. of Japan and a signal processor Model 7T21S.

TABLE 1

| Frequency Range | Saw No. | Noise (db) (a) 0 sec. | (b) 0.25 sec. | (c) 0.5 sec. | Attenuation |
|---|---|---|---|---|---|
| 3500–4500 Hz | 6 | 75 | 67 | 58 | 1.12 |
| | 1 | 74 | 53 | 43 | 2.36 |
| | 2 | 71 | 51 | 43 | 2.18 |
| | 3 | 73 | 50 | 44 | 2.20 |
| | 4 | 78 | 52 | 45 | 2.39 |
| 2800–3500 Hz | 6 | 77 | 61 | 59 | 1.16 |
| | 1 | 78 | 60 | 56 | 1.44 |
| | 2 | 70 | 53 | 43 | 2.12 |
| | 3 | 72 | 51 | 46 | 1.95 |
| | 4 | 78 | 53 | 43 | 2.59 |
| 2250–2800 Hz | 6 | 85 | 80 | 75 | 0.54 |
| | 1 | 84 | 56 | 45 | 2.71 |
| | 2 | 75 | 59 | 47 | 2.03 |
| | 3 | 78 | 55 | 45 | 2.39 |
| | 4 | 80 | 51 | 43 | 2.70 |
| 1950–2250 Hz | 6 | 64 | 56 | 56 | 0.54 |
| | 1 | 66 | 47 | 39 | 2.28 |
| | 2 | 72 | 54 | 44 | 2.14 |
| | 3 | 68 | 51 | 42 | 2.09 |
| | 4 | 70 | 50 | 40 | 2.43 |

(2) Cutting Noise

Use was made of a fixed-speed circular sawing machine with carriage to cut a piece of melamine overlaid particle board with 15 mm in thickness. Each circular saw was turned at the rate of 4000 rpm with the feeding speed of 10 m/min and the height of the saw from the table surface of machine was 10 mm. The diameter of each circular saw tested was 305 mm and that of the flange to which they were fastened was 90 mm. Under these conditions, the noise of cutting was measured at a point 1 meter away from the saw by means of a noise meter Model 1030 manufactured by Denshi Sokki, Inc. The results of measurements are shown in Table 2.

TABLE 2

| Saw No. | Noise (dB) |
|---|---|
| 6 | 101 |
| 1 | 91 |
| 2 | 87 |
| 3 | 88 |
| 4 | 87 |

(3) Noise of Idling

Noise made by each of the saws was measured when they were rotating freely (without cutting) under the same conditions as described above except the rate of rotary motion was changed from 2000 rpm to 6000 rpm. The results are shown in Table 3 wherein the right-hand column marked background noise shows the mechanical noise with the saw removed. FIG. 12 is a graphical representation of Table 3. One can see therein that the saw with only slits of conventional type (No. 6) resonates in certain frequency ranges to produce large (metallic) noise.

TABLE 3

| Rate of Revolution (× 100 rpm) | Saw No. | | | | | Background Noise |
|---|---|---|---|---|---|---|
| | 6 | 1 | 2 | 3 | 4 | |
| 20 | 98 | 75 | 75 | 75 | 74 | 70 |
| 22 | 88 | 76 | 76 | 77 | 76 | 71.5 |
| 24 | 90 | 78 | 78.5 | 78 | 76.5 | 73 |
| 26 | 80 | 80 | 81 | 80 | 80 | 74 |
| 28 | 82 | 81 | 83 | 81.5 | 79 | 74.5 |
| 30 | 102 | 82 | 84 | 83 | 79 | 71.5 |
| 32 | 100 | 83 | 85 | 84 | 80 | 74 |
| 34 | 104 | 84 | 86.5 | 85 | 81 | 74 |
| 36 | 97 | 85 | 87.5 | 86.5 | 82 | 75 |
| 38 | 89 | 87 | 89 | 87 | 82.5 | 75 |
| 40 | 90 | 88 | 90 | 88.5 | 84 | 76 |
| 42 | 91 | 88.5 | 90.5 | 89.5 | 84.5 | 76.5 |
| 44 | 92 | 89 | 91.5 | 91 | 85.5 | 78 |
| 46 | 105 | 90.5 | 93.5 | 92.5 | 85.5 | 76.5 |
| 48 | 107 | 91 | 96 | 94.5 | 86.5 | 78 |
| 50 | 104 | 91.5 | 97 | 95.5 | 87 | 78 |
| 52 | 97 | 93 | 97.5 | 96.5 | 87.5 | 80 |
| 54 | 99 | 94 | 98.5 | 98 | 88 | 80 |
| 56 | 100 | 95 | 100 | 99 | 88.5 | 80.5 |
| 58 | 100 | 96 | 100 | 100 | 89.5 | 82 |
| 60 | 100 | 96 | 1005 | 100 | 89.5 | 81.5 |

(4) Analysis of Vibrational Frequency

A frequency analyzer Signal Processor 7T21S manufactured by Sanei, Inc. was used to analyze the noise measured under the same conditions as in (2). The results are shown in FIGS. 7, 8, 9, 10 and 11, respectively for the saw Nos. 1, 2, 3, 4, and 6. FIG. 11 corresponding to the saw of a conventional type shows large fluctuations throughout the frequency range but fluctuations are small in FIGS. 7 through 10 corresponding to the saws embodying the present invention. A large fluctuation as seen in FIG. 11 implies that the saw executes large vibrations at that frequency and this tends to leave tooth marks on the wood being cut.

As explained above in detail, zigzag slits are prepared according to the present invention and one side of each protrusion thus produced is pressed against the root part of the adjacent protrusion in the opposite direction. As a result, the saw can attenuate vibrations more effectively and becomes less noisy when it is cutting an object or idling. Such slits may be produced by means of a high pressure liquid such as a water jet and the resulting protrusions may be deformed by physical means, but if a high energy beam such as a laser beam or an electron beam is used, the desired deformations automatically result as explained above and this simplifies the work, shortening the production process. Although circular saws were used above as examples, the present invention is applicable to any plate-like rotary body of which it is desired to suppress vibrations.

The foregoing description of a preferred embodiment of the invention has been presented for purposes of illustration and description. It is not intended to be exhaustive or to limit the invention to the precise form disclosed, and many modifications and variations are possible in light of the above teaching. Such modifications and variations which may be apparent to a person skilled in the art are intended to be included within the scope of this invention.

I claim:

1. In an approximately circular plate-like rotary body, the improvement wherein a plurality of zigzag slits are formed in said body in the plane thereof, said zigzag slits each forming two mutually engaging comb-like formations on both sides thereof, each of said comb-like formations having a plurality of tonque-like elongated protruding sections alternating with recesses such that said protruding sections from one of said sides protrude toward and are received by said recesses from the other of said sides, said protruding sections touching adjacent ones of said protruding sections from opposite side whereby friction between said protruding sections from opposite sides suppresses vibrations of said rotary body.

2. The rotary body of claim 1 wherein distances of protrusion of said elongated protruding sections vary gradually from one end to the other of each of said slits.

3. The rotary body of claim 1 wherein said body is formed with holes at ends of said zigzag slits.

4. The rotary body of claim 1 wherein said body is a circular saw.

5. The rotary body of claim 1 wherein each of said zigzag slits is formed between a peripheral point on the outer surface of said rotary body and an internal point in an outer peripheral area of said rotary body.

6. The rotary body of claim 1 wherein each of said zigzag slits is formed between a first point in an outer peripheral area and a second point in a middle peripheral area of said rotary body.

7. The rotary body of claim 6 wherein peripheral slits are additionally formed in said rotary body between points on the outer periphery thereof and internal end points.

8. The rotary body of claim 7 wherein said peripheral slits are straight.

9. The rotary body of claim 7 wherein said peripheral slits are zigzagged.

10. The rotary body of claim 7 wherein each of said internal end points is nearly at equidistance from mutually adjacent two of said first points.

11. A method of manufacturing a plate-like rotary body with vibration-suppressing characteristics, comprising the steps of
providing an approximately circular plate-like body with an outer peripheral area and a middle peripheral area,
cutting zigzag slits in said body in the plane thereof, thereby poducing elongated protruding sections and recesses alternatingly on both sides along each of said slits such that said protruding sections from one of said sides protrude toward and are received by said recesses from the other of said sides, and
deforming said protruding sections so that adjacent ones of said protruding sections on opposite sides of each said slits touch each other.

12. The method of claim 11 wherein said cutting and deforming steps comprise using a high energy beam such as a laser beam or an electron beam to cut said plate-like body whereby deformation of said protruding sections results automatically.

13. The method of claim 11 wherein said cutting step comprises using a high-pressure liquid such as a water jet and said deforming step comprises applying external physical force.

14. The method of claim 11 wherein said rotary body is a circular saw.

15. The method of claim 11 wherein each of said zigzag slits is formed between a peripheral point on the outer surface of said rotary body and an internal point in said outer peripheral area of said rotary body.

16. The method of claim 11 wherein each of said zigzag slits is formed between a first point in an outer peripheral area and a second point in a middle peripheral area of said rotary body.

17. The method of claim 11 wherein peripheral slits are additionally formed in said rotary body between points on the outer circumference thereof and internal end points.

18. The method of claim 11 wherein distances of protrusion of said elongated protruding sections vary gradually from one end to the other of each of said slits.

19. The method of claim 11 further comprising the step of forming holes in said body at ends of said slits.

* * * * *